(12) United States Patent
Andersson et al.

(10) Patent No.: US 11,454,178 B2
(45) Date of Patent: Sep. 27, 2022

(54) METHOD FOR CONTROLLING AN INTERNAL COMBUSTION ENGINE ARRANGEMENT

(71) Applicant: VOLVO TRUCK CORPORATION, Göthenburg (SE)

(72) Inventors: Arne Andersson, Mölnlycke (SE); Lennart Andersson, Varberg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 16/976,293

(22) PCT Filed: Mar. 12, 2018

(86) PCT No.: PCT/EP2018/056046
§ 371 (c)(1),
(2) Date: Aug. 27, 2020

(87) PCT Pub. No.: WO2019/174706
PCT Pub. Date: Sep. 19, 2019

(65) Prior Publication Data
US 2021/0040901 A1 Feb. 11, 2021

(51) Int. Cl.
*F02D 13/02* (2006.01)
*F01N 9/00* (2006.01)
*F02D 41/02* (2006.01)

(52) U.S. Cl.
CPC ......... *F02D 13/0261* (2013.01); *F01N 9/00* (2013.01); *F02D 41/0245* (2013.01); *F01N 2610/02* (2013.01)

(58) Field of Classification Search
CPC . F02M 26/01; F02D 13/0261; F02D 41/0245; F01N 9/00; F01N 2610/02
See application file for complete search history.

(56) References Cited

U.S. PATENT DOCUMENTS 6,253,543 B1 * 7/2001 Russell ................. F02D 41/405
60/303
8,590,517 B2 * 11/2013 Yokoo ................... F02M 26/01
123/568.14

(Continued)

FOREIGN PATENT DOCUMENTS

CN 101360893 A 2/2009
CN 101529067 A 9/2009

(Continued)

OTHER PUBLICATIONS

International Search Report and Written Opinion dated Nov. 14, 2018 in corresponding International PCT Application No. PCT/EP2018/056046, 8 pages.

(Continued)

*Primary Examiner* — Gonzalo Laguarda
(74) *Attorney, Agent, or Firm* — Venable LLP; Jeffri A. Kaminski

(57) ABSTRACT

The present invention relates to a method for controlling an internal combustion engine arrangement, which method comprises the steps of controlling an outlet valve to be arranged in an at least partial open position during a portion of an intake stroke; and providing a reducing agent to at least a portion of the flow of combustion gas exhausted from the combustion cylinder during an exhaust stroke.

20 Claims, 6 Drawing Sheets

(56) References Cited

U.S. PATENT DOCUMENTS

| | | | |
|---|---|---|---|
| 9,032,941 | B2 | 5/2015 | Dean et al. |
| 9,422,848 | B2 | 8/2016 | Nagaoka et al. |
| 9,903,319 | B2* | 2/2018 | Di Nunno ............ F02D 13/0265 |
| 10,294,839 | B2* | 5/2019 | Bailey .................. F01N 3/0814 |
| 11,149,622 | B2* | 10/2021 | Gawell ................. F02B 37/025 |
| 2006/0010855 | A1 | 1/2006 | Kemmner et al. |
| 2008/0283028 | A1* | 11/2008 | Endo ..................... F02D 41/006 123/568.14 |
| 2013/0232952 | A1 | 9/2013 | zur Loye et al. |

FOREIGN PATENT DOCUMENTS

| | | |
|---|---|---|
| CN | 101949333 A | 1/2011 |
| CN | 103527289 A | 1/2014 |
| CN | 105829672 A | 8/2016 |
| CN | 107620622 A | 1/2018 |
| CN | 107725154 A | 2/2018 |
| DE | 102004006173 A1 | 8/2005 |
| DE | 102006049392 A1 | 5/2007 |
| EP | 2682580 A2 | 1/2014 |
| EP | 2792862 A1 | 10/2014 |
| GB | 2518360 A | 3/2015 |
| JP | H06272536 A | 9/1994 |
| JP | 2002021539 A | 1/2002 |
| JP | 2004076595 A | 3/2004 |
| JP | 2005061362 A | 3/2005 |
| JP | 2006226187 A | 8/2006 |
| JP | 2006274847 A | 10/2006 |
| JP | 2008014236 A | 1/2008 |
| JP | 2013007305 A | 1/2013 |
| JP | 2014009660 A | 1/2014 |
| WO | 2016089963 A1 | 6/2016 |
| WO | 2018024937 A1 | 2/2018 |

OTHER PUBLICATIONS

China Office Action dated Feb. 25, 2022 in corresponding China Patent Application No. 201880090990.9, 30 pages.

* cited by examiner

METHOD FOR CONTROLLING AN INTERNAL COMBUSTION ENGINE ARRANGEMENT

CROSS-REFERENCE TO RELATED APPLICATIONS

This application is a U.S. National Stage application of PCT/EP2018/056046, filed Mar. 12, 2018, and published on Sep. 19, 2019, as WO 2019/174706 A1, all of which is hereby incorporated by reference in its entirety.

TECHNICAL FIELD

The present invention relates to a method for controlling an internal combustion engine arrangement. The invention also relates to a corresponding internal combustion engine arrangement. The invention is applicable on vehicles, in particularly low, medium and heavy duty vehicles commonly referred to as trucks. Although the invention will mainly be described in relation to a truck, it may also be applicable for other type of vehicles.

BACKGROUND

For many years, the demands on internal combustion engines have been steadily increasing and engines are continuously developed to meet the various demands from the market. Reduction of exhaust gases, increasing engine efficiency, i.e. reduced fuel consumption, and lower noise level from the engines are some of the criteria that becomes an important aspect when choosing vehicle engine. Furthermore, in the field of trucks, there are applicable law directives that have e.g. determined the maximum amount of exhaust gas pollution allowable.

Conventionally, a combustion cylinder of an internal combustion engine comprises an inlet valve and an outlet valve, wherein the inlet valve is arranged in an open position at an intake phase during the downward motion of a piston in the combustion cylinder. The inlet valve is thereafter closed when the piston reaches the bottom dead center of the cylinder, and is closed during the combustion phase, the expansion phase and the exhaust phase, and opened again when the piston reaches the top dead center for the next coming intake stroke.

Moreover, a selective catalytic reduction (SCR) is often provided downstream the combustion cylinder. Hereby, nitrogen oxide (NOx) is converted into diatomic nitrogen ($N_2$) and water ($H_2O$). However, when operating the SCR, the exhaust temperature should preferably exceed a predetermined temperature limit for proper functioning of the SCR.

There is thus a desire to improve the operation of the SCR, in particular during low load operation where the temperature of the exhaust gas is relatively low.

SUMMARY

It is an object of the present invention to provide a method for controlling an internal combustion engine arrangement which at least partially overcomes the above described deficiencies. This is achieved by a method according to claim 1.

According to a first aspect of the present invention, there is provided a method for controlling an internal combustion engine arrangement, the internal combustion engine arrangement comprising a combustion cylinder housing a reciprocating piston movable between a bottom dead center and a top dead center within the combustion cylinder; an inlet valve operable between an open position and a closed position, the inlet valve being arranged in the open position during at least a part of an intake stroke of the reciprocating piston for allowing a flow of fluid medium into the combustion cylinder; and an outlet valve operable between an open position and a closed position, the outlet valve being arranged in the open position during at least a part of an exhaust stroke of the reciprocating piston for directing a flow of combustion gas out from the combustion cylinder; the method comprising the steps of controlling the outlet valve to be arranged in an at least partial open position during a portion of the intake stroke; and providing a reducing agent to at least a portion of the flow of combustion gas exhausted from the combustion cylinder during the exhaust stroke.

The wordings "top dead center" and "bottom dead center" should be construed as respective upper and lower end positions for the reciprocating motion of the piston within the combustion cylinder. When stating that a valve is opened and closed at one of the top dead center and bottom dead center, it should be realized that some tolerances are within the scope of the specific definition. For example, when stating that the inlet valve is opened, i.e. positioned in the open position when the piston reaches the top dead center, the inlet valve must not necessarily be opened at the exact top dead center position of the piston, but can be opened slightly before the piston reached the top dead center, or slightly after the piston has left the top dead center.

The intake stroke is the stroke of the internal combustion engine when the piston moves from the top dead center (TDC) to the bottom dead center (BDC) and intake gas, preferably in the form of air, is provided into the combustion chamber. The exhaust stroke on the other hand is the stroke of the internal combustion engine when the piston moves from the BDC to the TDC and exhaust combusted exhaust gas through the outlet valve.

Moreover, the wording "reducing agent" should be understood to mean an element that is used in a reduction process. In the reduction process, the reducing agent loses electron(s) and is said to have been oxidized. Various types of reducing agents can be used and the present invention should not be construed as limited to any specific kind. However, as a non-limiting example, the reducing agent may be a water-based urea solution which is provided into the exhaust gas aftertreatment system.

The inventors of the present disclosure have realized that by opening the outlet valve during a relatively short time period during the intake stroke, relatively warm exhaust gas is forced into the combustion chamber and mixed with the intake gas flowing through the inlet valve. An advantage is that the temperature of the combustion gas exhausted during the following exhaust stroke is increased. The increased temperature will enable evaporation of the reducing agent to form ammonia. The ammonia will in turn make the SCR catalyst burn off at a much lower temperature. Accordingly, an improved SCR catalyst operation is achieved. This may be particularly advantageous when operating only one of the cylinders as described above as a potential penalty of the overall efficiency is reduced.

According to an example embodiment, the reducing agent may be injected to the flow of combustion gas in the vicinity of the outlet valve.

The wording "vicinity" should be understood as a position located close to the outlet valve downstream the combustion cylinder. Hence, the reducing agent is injected into a conduit arranged between the combustion chamber and an exhaust manifold of the internal combustion engine. The reducing agent should preferably evaporate before reaching a turbine of the internal combustion engine arrangement.

According to an example embodiment, the outlet valve may be arranged in the at least partial open position when the piston is preferably positioned between 60-120 crank angle degrees (CAD) from the top dead center during the intake stroke, more preferably between 65-115 CAD from the top dead center, and most preferably between 70-110 CAD from the top dead center. Other alternatives are also conceivable.

Hereby, a sufficient amount of relatively warm exhaust gas can be directed into the combustion chamber during the intake stroke.

According to an example embodiment, the outlet valve may be opened between 5-45% of its full openness capacity during the portion of the intake stroke.

The wording "openness degree" should be understood as a ratio of the full openness capacity of the outlet valve. The openness capacity may preferably be a length measurement, measured in e.g. millimeters. For example, if the outlet valve is moved, i.e. opened, approximately 12 mm from its closed position during the exhaust stroke, it may be moved approximately 0.6-5.4 mm during the intake stroke. Other alternatives are of course conceivable and depend on the application of use, specific type of internal combustion engine, etc. For example, the outlet valve may be fully opened during a short period of time during the intake stroke.

According to an example embodiment, the method may further comprise the step of controlling the internal combustion engine arrangement to provide a reduced volume of fluid medium into the combustion cylinder during the intake stroke.

The reduced volume of fluid medium should be construed such that less amount of fluid medium, preferably air, is sucked into the combustion chamber during the intake stroke. Various example alternatives of achieving the reduction are given below. Reducing the amount of fluid medium during the intake is advantageous as it further increases the temperature of the combustion gas exhausted during the exhaust stroke. In particular, during low engine load operation, the air-fuel ratio is relatively high, i.e. a relatively large amount of air and a relatively low amount of fuel is provided to the combustion chamber. Hence, such ratio is reduced by reducing the volume of fluid medium into the combustion cylinder during the intake stroke.

According to an example embodiment, the reduced volume of fluid medium may be achieved by controlling the inlet valve to be arranged in the closed position during a portion of the intake stroke.

Hereby, during the portion of the intake stroke when the inlet valve is closed, no fluid medium is allowed into the combustion chamber, whereby the gas pressure level therein will be reduced as the piston moves downwards towards the BDC.

According to an example embodiment, the reduced volume of fluid medium may be achieved by controlling the inlet valve to be arranged in the closed position a distance before the piston reaches the bottom dead center during the intake stroke.

Hereby, a so-called Early-Miller approach is achieved. The inlet valve is thus arranged in the closed position when the piston is located at a predetermined number of crank angle degrees from the BDC, and maintained in the closed position until initiation of the subsequent intake stroke. An advantage of controlling the inlet valve according to the Early-Miller approach is that e.g. cam phaser may be used for controlling the inlet valve timing. The inlet valve timing may however be controlled by other means such as by a flow controllable inlet valve actuator as will be described further below. The same applies for controlling the valve timing of the outlet valve.

According to an example embodiment, the reduced volume of fluid medium may be achieved by controlling an intake throttle positioned in upstream fluid communication with the inlet valve.

Hereby, the reduction of fluid medium into the combustion chamber may be achieved either by controlling the throttle or by controlling the inlet valve timing, or controlling both the throttle and the inlet valve.

The throttle is thus positioned such that fluid medium passes the throttle before directed into the combustion chamber. Fluid medium is directed through the throttle and into the combustion chamber via the inlet valve.

According to an example embodiment, the internal combustion engine arrangement may comprise a plurality of combustion cylinders, each of the plurality of combustion cylinders housing a respective reciprocating piston, wherein the steps of controlling the outlet valve to be arranged in the at least partial open position during a portion of the intake stroke; and providing reducing agent to at least a portion of the flow of combustion gas exhausted from the combustion cylinder during the exhaust stroke is performed for a single one of the plurality of combustion cylinders.

Hereby, only one outlet valve is controlled according to the above description. Thus, the effects described above can be achieved by simply controlling the flow of fluid medium in connection to one of the cylinders.

According to an example embodiment, the method may further comprise the steps of determining an engine load for the internal combustion engine arrangement; and controlling the outlet valve to be arranged in an at least partial open position during a portion of the intake stroke; and providing reducing agent to at least a portion of the flow of combustion gas exhausted from the combustion cylinder during the exhaust stroke only if the engine load is below a predetermined threshold limit.

The wording "engine load" should be construes to relate to power consumption of the internal combustion engine. When the internal combustion engine is operated under low engine load condition, the supply of fluid flow into the combustion chamber is relatively high in comparison to the supply of combustible fuel. The engine load may thus relate to the amount of fuel provided to the combustion chamber. Another parameter measuring the engine load is the so-called mean effective pressure (MEP) which is a measure of the engine's capacity to do work.

As described above, during low engine load, the temperature of the combustion gas is relatively low. The advantage is thus that the outlet valve is opened during the intake stroke and reducing agent is supplied only when necessary. Hence, during high load, the cylinder(s) of the internal combustion engine arrangement is operated according to normal principle.

According to a second aspect, there is provided an internal combustion engine arrangement comprising a combustion cylinder housing a reciprocating piston movable between a bottom dead center and a top dead center within the combustion cylinder; an inlet valve operable between an open position and a closed position, the inlet valve being arranged in the open position during at least a part of an intake stroke of the reciprocating piston for allowing a flow of fluid medium into the combustion cylinder; an outlet valve operable between an open position and a closed position, the outlet valve being arranged in the open position during at least a part of an exhaust stroke of the reciprocating piston for directing a flow of combustion gas out from the combustion cylinder; a reducing agent injector positioned in downstream fluid communication with the combustion cylinder and arranged to inject a reducing agent to at least a portion of the flow of combustion gas exhausted from the combustion cylinder during the exhaust stroke; and a control unit connectable to the outlet valve and the reducing agent injector, the control unit being configured to control the outlet valve to be arranged in an at least partial open position during a portion of the intake stroke; and control the reducing agent injector to provide the reducing agent to at least a portion of the flow of combustion gas exhausted from the combustion cylinder during the exhaust stroke.

The control unit may include a microprocessor, microcontroller, programmable digital signal processor or another programmable device. The control unit may also, or instead, include an application specific integrated circuit, a programmable gate array or programmable array logic, a programmable logic device, or a digital signal processor. Where the control unit includes a programmable device such as the microprocessor, microcontroller or programmable digital signal processor mentioned above, the processor may further include computer executable code that controls operation of the programmable device.

The control unit is thus preferably directly or indirectly connected to the outlet valve and the reducing agent injector. The control unit may be connected to the outlet valve via a cam shaft or via a flow controllable inlet actuator.

According to an example embodiment, the internal combustion engine may further comprise an exhaust gas manifold arranged downstream the combustion cylinder for receiving the flow of combustion gas exhausted during the exhaust stroke, wherein the reducing agent injector is positioned in fluid communication between the combustion cylinder and the exhaust gas manifold.

According to an example embodiment, the internal combustion engine may further comprise a controllable intake throttle arranged in upstream fluid communication with the inlet valve, wherein the controllable intake throttle is connected to the control unit, the control unit being further configured to control the controllable intake throttle to provide a reduced volume of fluid medium into the combustion cylinder during the intake stroke.

According to an example embodiment, the inlet valve may comprise a flow controllable inlet actuator connected to the control unit, the flow controllable inlet actuator being arranged to controllably operate the inlet valve between the open position and the closed position.

According to an example embodiment, the outlet valve may comprise a flow controllable outlet actuator connected to the control unit, the flow controllable outlet actuator being arranged to controllably operate the outlet valve between the open position and the closed position.

A flow controllable actuator is preferably pneumatically operated by receiving pressurized gas for opening and closing the inlet and outlet valves.

Hereby, the inlet and outlet valves can be controlled independently of the rpm of a crank shaft connected to the reciprocating piston.

According to an example embodiment, the internal combustion engine arrangement may further comprise a cam shaft for controlling the outlet valve between the open position and the closed position, wherein the cam shaft comprises a de-activatable protruding portion configured to arrange the outlet valve in the at least partial position during the portion of the intake stroke.

The de-activatable protruding portion is thus an arrangement of the cam shaft which is arranged to control the outlet valve to be arranged in the at least partially open position. When there is no desire to open the outlet valve during the intake stroke, the protruding portion is not acting on the outlet valve, thus being de-activated.

According to an example embodiment, the control unit may be further configured to control the internal combustion engine arrangement to perform any one of the method steps described above in relation to the first aspect.

Further effects and features of the second aspect are largely analogous to those described above in relation to the first aspect.

According to a third aspect, there is provided a vehicle comprising an internal combustion engine arrangement according to any one of the embodiments described above in relation to the second aspect.

According to a fourth aspect, there is provided a computer program comprising program code means for performing the steps of any one of the embodiments described above in relation to the first aspect when said program is run on a computer.

According to a fifth aspect, there is provided a computer readable medium carrying a computer program comprising program means for performing the steps of any one of the embodiments described above in relation to the first aspect when said program means is run on a computer.

Effects and features of the third, fourth and fifth aspects are largely analogous to those described above in relation to the first and second aspects.

Further features of, and advantages with, the present invention will become apparent when studying the appended claims and the following description. The skilled person will realize that different features of the present invention may be combined to create embodiments other than those described in the following, without departing from the scope of the present invention.

BRIEF DESCRIPTION OF THE DRAWINGS

The above, as well as additional objects, features and advantages of the present invention, will be better understood through the following illustrative and non-limiting detailed description of exemplary embodiments of the present invention, wherein.

DETAILED DESCRIPTION OF EXAMPLE EMBODIMENTS OF THE INVENTION

Figure 1:
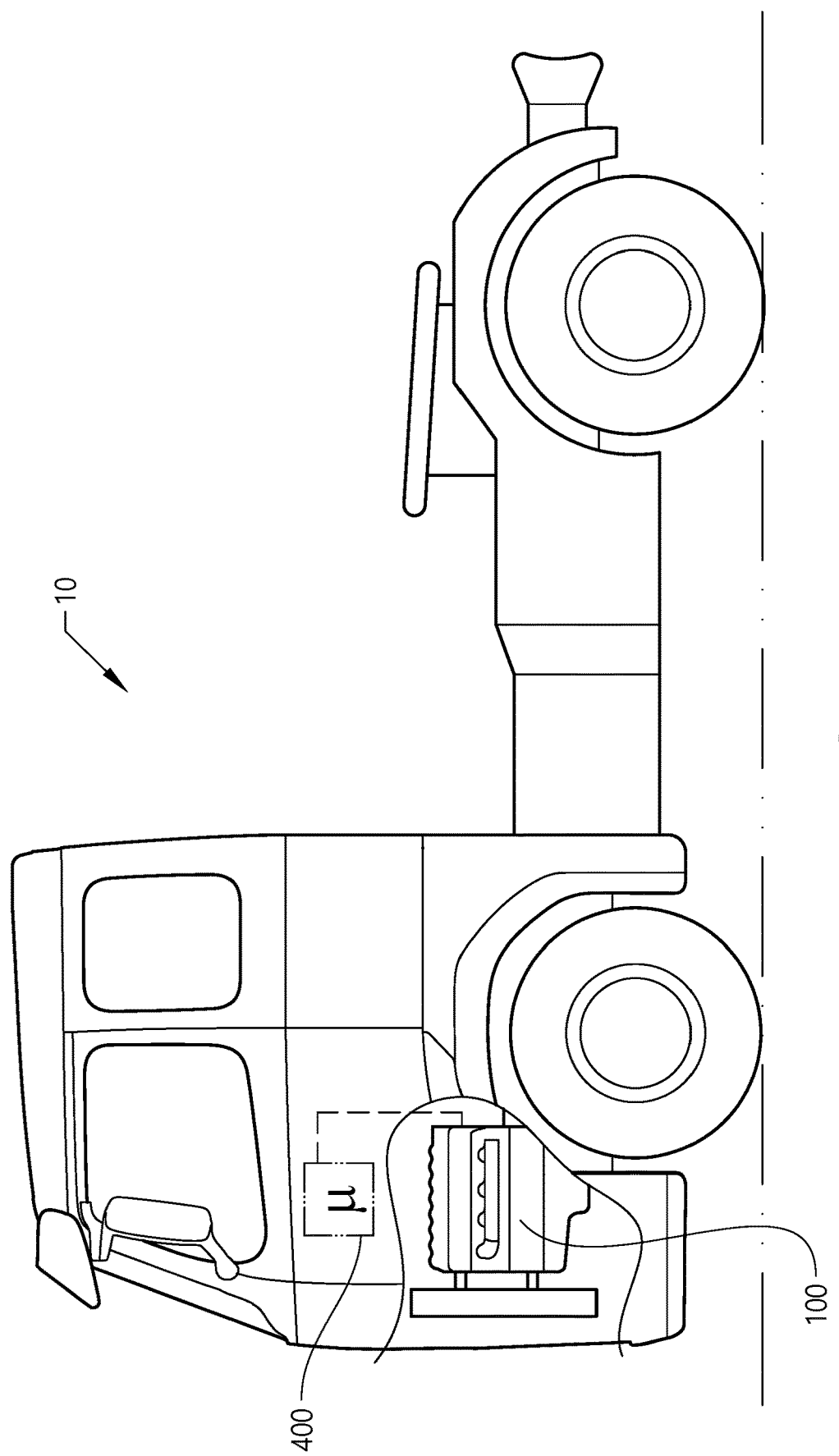
FIG. 1 is a lateral side view illustrating an example embodiment of a vehicle in the form of a truck.

The present invention will now be described more fully hereinafter with reference to the accompanying drawings, in which exemplary embodiments of the invention are shown. The invention may, however, be embodied in many different forms and should not be construed as limited to the embodiments set forth herein; rather, these embodiments are provided for thoroughness and completeness. Like reference character refer to like elements throughout the description.

With particular reference to FIG. 1, there is provided a vehicle 10 in the form of a truck. The vehicle 10 comprises a prime mover 100 in the form of an internal combustion engine arrangement 100. The internal combustion engine arrangement 100 may be propelled by e.g. a conventional fuel such as diesel, although other alternatives are conceivable. The internal combustion engine 100 is preferably operated in a four stroke fashion, i.e. operated by an intake stroke, a compression stroke, a combustion stroke, and an exhaust stroke. As further depicted in FIG. 1, the internal combustion engine arrangement 100 also comprises a control unit 400 for controlling operation of the internal combustion engine arrangement 100. The control unit 400 is thus preferably arranged to control inlet and outlet valves (depicted for example in FIGS. 4a-4c) and/or to control operation of the intake throttle (108 in FIG. 2) described below.

Figure 2:
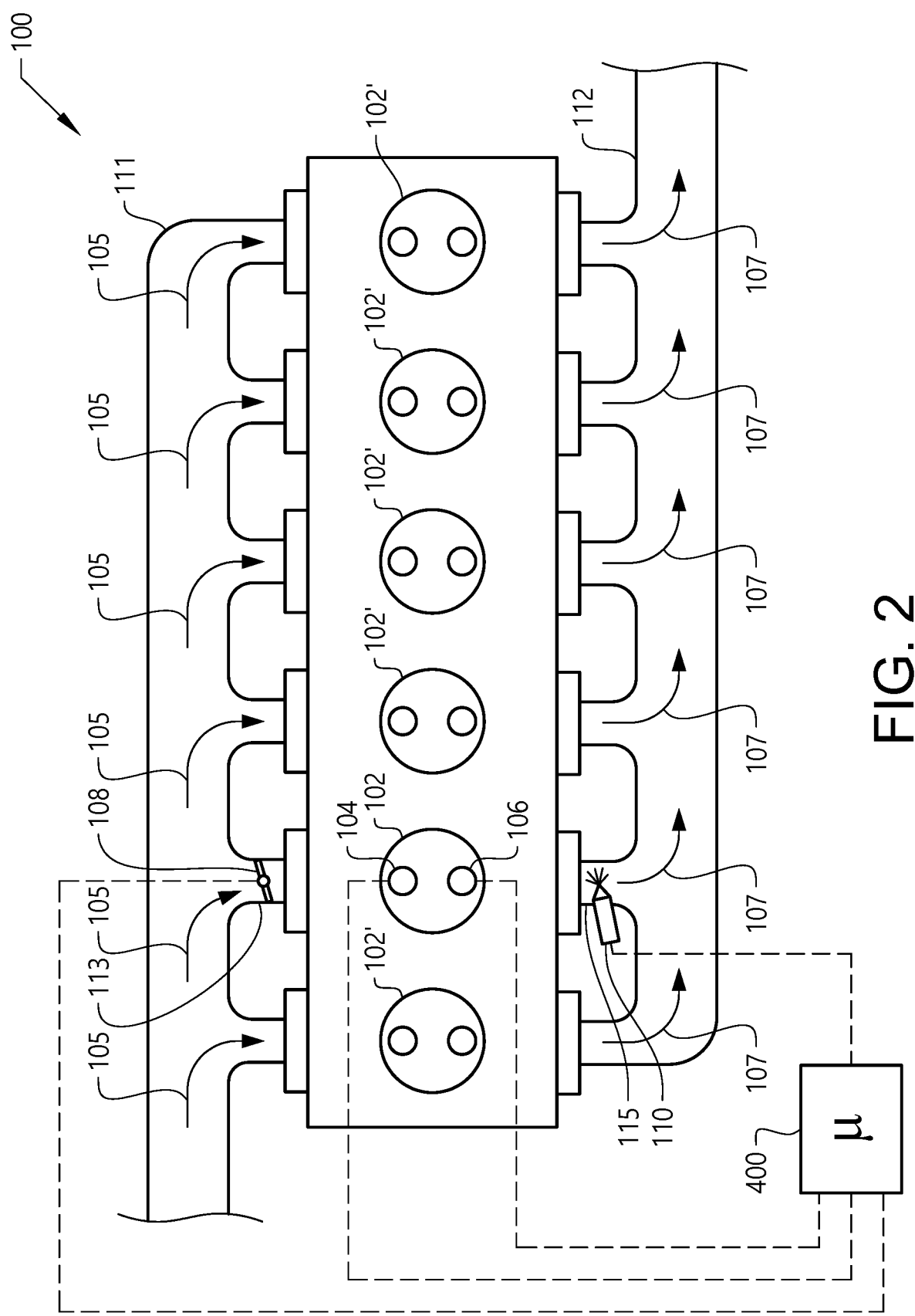
FIG. 2 is a schematic illustration of an internal combustion engine arrangement according to an example embodiment.

Reference is made to FIG. 2 which is a schematic illustration of an internal combustion engine arrangement 100 according to an example embodiment. As can be seen, the internal combustion engine arrangement 100 comprises six combustion cylinders 102, 102', each arranged in fluid communication with an inlet manifold 111 and an exhaust manifold 112. Moreover, the internal combustion engine arrangement 100 comprises an intake throttle 108 positioned in a conduit 113 which is arranged in fluid communication between the inlet manifold and one of the combustion cylinders 102. The internal combustion engine arrangement 100 further comprises a reducing agent injector 110 positioned in a conduit 115 which is arranged in fluid communication between the combustion cylinder 102 and the exhaust manifold 112. The reducing agent injector 110 is arranged to controllably inject a flow of reducing agent, such as e.g. urea to the combustion gas exhausted from the combustion cylinder 102.

Still further, the internal combustion engine arrangement 100 comprises an inlet valve 104 and an outlet valve 106 for each of the cylinders 102, 102'. The inlet valve 106 is operable between an open position and a closed position for controlling flow of fluid medium into the combustion cylinder. Such flow of fluid medium is preferably air 105 directed into the combustion cylinders via the inlet manifold 111. The outlet valve 106 is also operable between an open position and a closed position for controlling the flow of combustion gas out from the combustion cylinder 102.

In the example embodiment depicted in FIG. 2, the intake throttle 108, the inlet valve 104, the outlet valve 106 and the reducing agent injector 110 are connected to the control unit 400. The control unit 400 is thus arranged to control operation of the respective one of the intake throttle 108, the inlet valve 104, the outlet valve 106 and the reducing agent injector 110.

Although FIG. 2 illustrates a single inlet valve 104 and a single outlet valve 106 for each of the cylinders 102, 102', other alternatives are also conceivable, such as e.g. two inlet valves and two outlet valves. In such a case, one of the outlet valves may be arranged in fluid communication with a first exhaust manifold and the other one of the outlet valves may be arranged in fluid communication with a second exhaust manifold, whereby reducing agent is injected to only one of the first and second exhaust manifolds, or to both.

In the embodiment depicted in FIG. 2, the internal combustion engine arrangement 100 only comprises one intake throttle 108 and one reducing agent injector 110, which are arranged in connection to one of the combustion cylinders 102. The following description thus relate to operation of the valves 104, 106, intake throttle 108 and reducing agent injector 110 in connection to this specific combustion cylinder 102.

Figure 3:
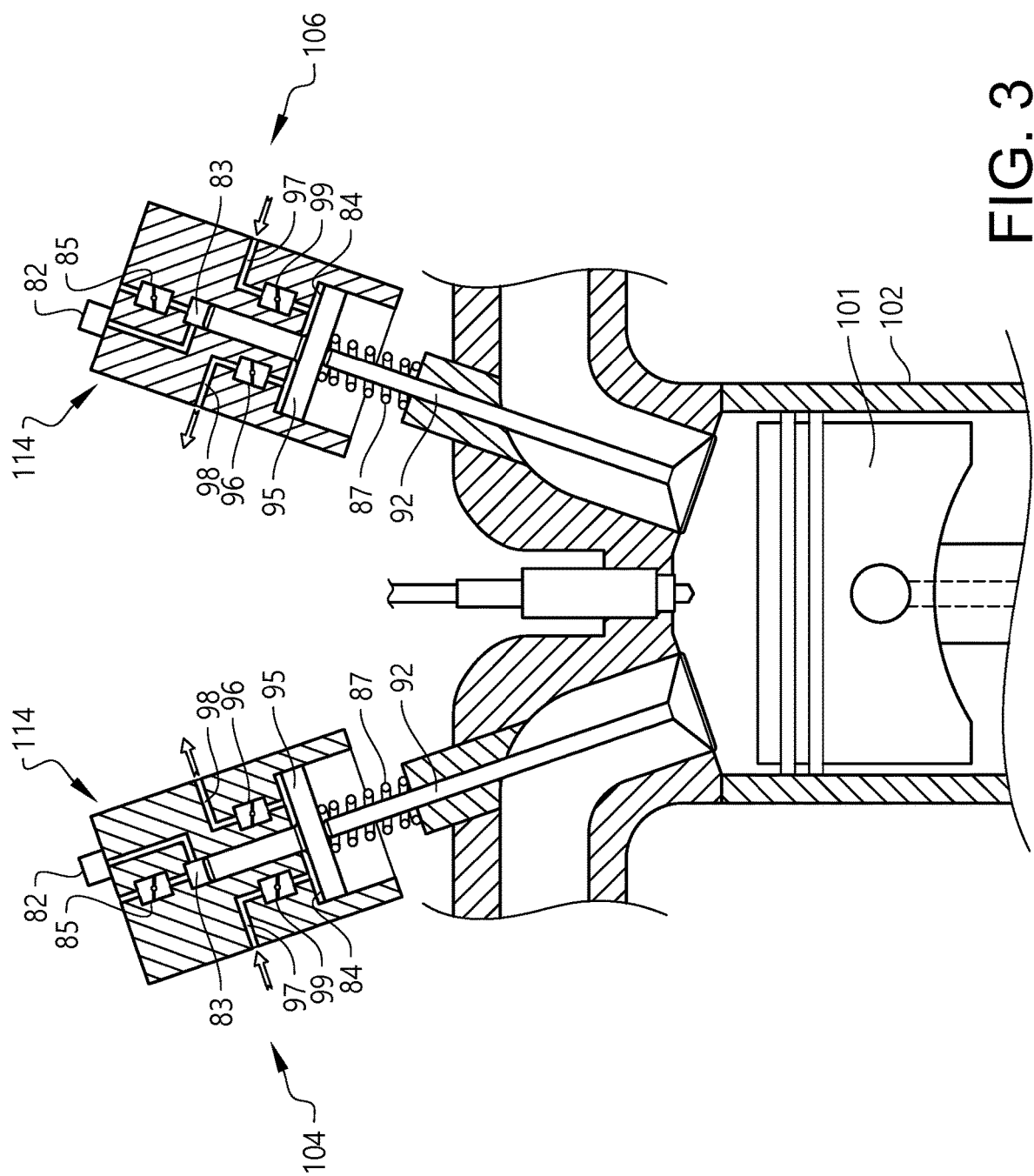
FIG. 3 is an example embodiment of an inlet and an outlet valve for controlling the flow of fluid medium into the combustion cylinder.

Reference is now made to FIG. 3 which illustrates an example embodiment of an inlet 104 and an outlet valve 106 for controlling the flow into and out from the combustion cylinder 102. In detail, FIG. 3 illustrate the combustion cylinder 102, a reciprocating piston 101, the inlet 104 and outlet 106 valves, wherein each of the inlet valve 104 and outlet valve 106 comprises a respective flow controllable actuator 114, which flow controllable actuator is arranged to controllably operate the respective valve between the open position and the closed position. The flow controllable actuator 114 is thus preferably connected to the control unit 400 depicted in FIGS. 1 and 2 for controlling operation thereof. The description in relation to FIG. 3 will now solely focus on the flow controllable actuator 114 for presenting an example embodiment of how to control the operation of the inlet 104 and outlet 106 valves. For simplifying the description, reference is made to the flow controllable actuator 114 arranged in connection to the inlet valve 104.

The inlet valve 104 thus comprises the flow controllable actuator 114 operatively connected to the valve member 92. The valve member is here a lift type valve member. By way of example, the lift type member can be a conventional poppet valve or the like. However, the valve member may likewise be provided as a rotational type valve member, a slide valve member, a seat valve member or the like. The actuator of the valve is configured to operate the valve member 92 by pneumatic pressure. As such, the valve member is a pressure actuated valve member. In this example, the flow controllable actuator 114 comprises a pneumatic actuator operatively connected to a corresponding valve member. In particular, the actuator 114 of the inlet valve 104 is configured to operate the valve member via an actuator piston 95. The actuator 114 is in fluid communication with a pressurized air medium (not shown) via an air inlet 97 and an air outlet 98. In this manner, the pneumatic valve actuation utilizes compressed air to control the valve opening of the valve member, i.e. to operate the valve member between an open state and a closed state. Accordingly, the actuator comprises at least the air inlet 97 for the pressure fluid medium and at least the air outlet 98 for the pressure fluid medium. The pressurized air flowing in via the air inlet 97 is directed towards the actuator piston 95 by means of an air inlet valve 99. The air inlet valve 99 is disposed in the air inlet and configured to open and close the air inlet so as to control the flow of air to the actuator piston 95. Further, there is disposed an air outlet valve 96 in the air outlet 98, which is configured to open and close the air outlet in order to permit air to discharge from the actuator. Typically, as shown in FIG. 3, the actuator piston 95 is disposed in a chamber 84 defining a space for a reciprocating movement of the actuator piston 95. The actuator piston 95 is operable between a first position (an upper position), in which the valve member 92 is in the closed state, and a second position (a lower position), in which the valve member 92 is in the open state. The actuator piston 95 is operable between the first position (upper position) and the second position (lower position) by pressurizing and depressurizing the actuator. In addition, the flow controllable valve comprises a spring 87 arranged in-between the valve member 92 and the actuator piston 95 so as to return the valve member to its original position, i.e. corresponding to the upper position of the actuator piston disc 95.

The flow controllable valve may also have a hydraulic circuit comprising a hydraulic valve 85 and a chamber 82. Hydraulic fluid is provided to a chamber 83 in connection with the actuator piston 95. Hereby, when the piston moves to the second position, the hydraulic fluid in the chamber 83 dampens the motion of the actuator piston 95.

Figure 4C:
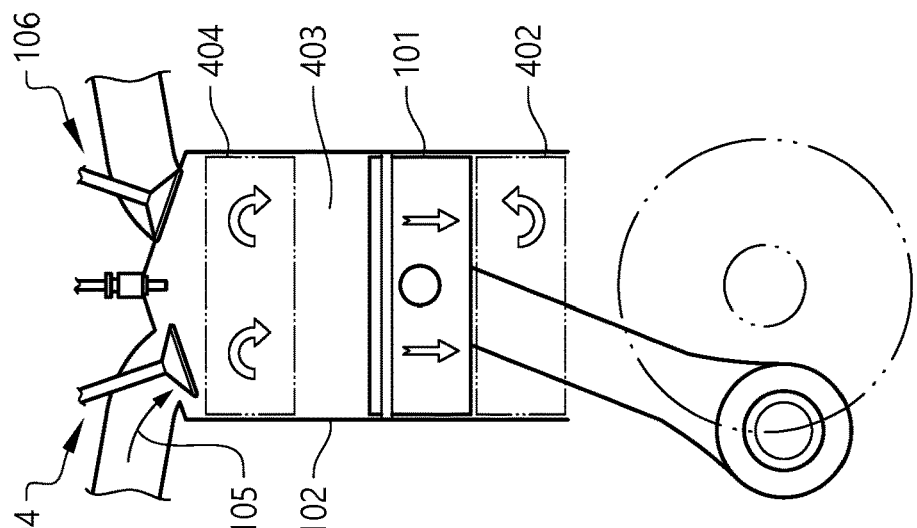
FIGS. 4a-4c illustrate different valve positions during the intake stroke of the combustion cylinder according to an example embodiment.
Figure 4B:
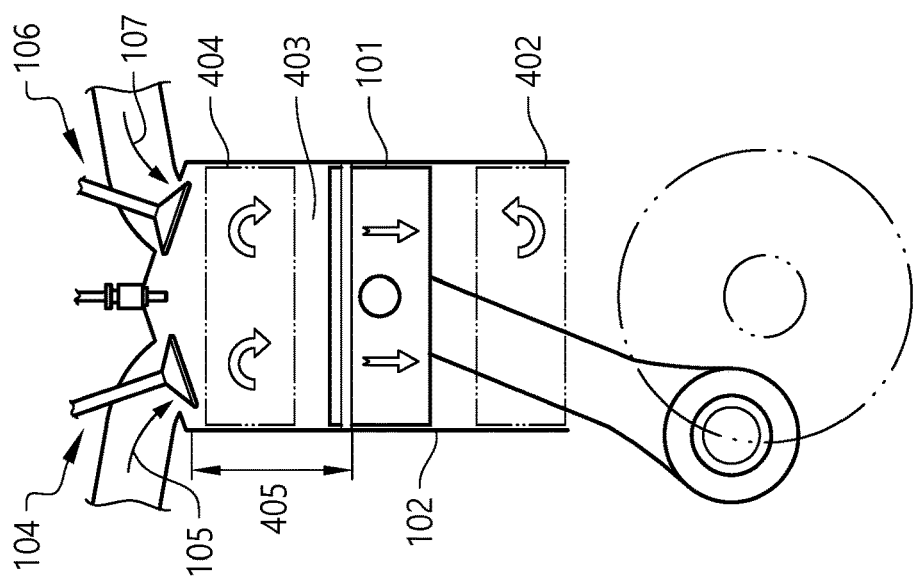
Figure 4A:
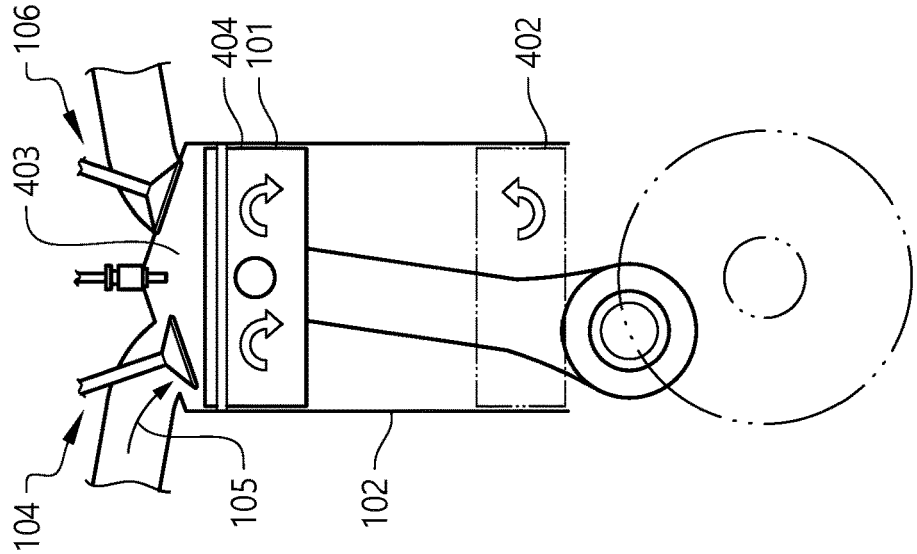

Reference is now made to FIGS. 4a-4c which illustrate different valve positions during the intake stroke of the combustion cylinder according to an example embodiment. As depicted, the reciprocating piston 101 is movable between a bottom dead center (BDC) position 402 and a top dead center (TDC) positon 404. These positions are indicated by dashed lines in FIGS. 4a-4c. The BDC 402 and the TDC 404 corresponds to the "turning positions" of the piston 101.

As can be seen in FIG. 4a, during the initial stage of the intake stroke, the reciprocating piston 101 is arranged at the TDC 404 and has initiated its downward motion towards the BDC 402. The inlet valve 104 is arranged in the open position for allowing flow of fluid medium 105 to be provided into the combustion chamber 403 of the combustion cylinder 102.

Furthermore, and as depicted in FIG. 4b, when the reciprocating piston 101 has traveled a predetermined distance 405 from the TDC 402, also the outlet valve 106 is arranged in the open position for a short period of time. The outlet valve 106 may, for example, be arranged in the open position after the reciprocating piston 101 has traveled 60-70 CAD from the TDC. The outlet valve 106 may then, for example, be open for approximately 40-60 CAD. As the outlet valve 106 is open only for a short period of time, its openness degree may be approximately 5-45% of its full openness capacity.

By opening the outlet valve 106 during intake stroke, combustion gas 107 is provided into the combustion chamber 403 together with the fluid medium 105 provided through the inlet valve 104. Hereby, the combustion gas subsequently generated during the combustion stage will have an increased temperature in comparison to normal intake stroke operation where the outlet valve is kept closed.

After further downward motion of the reciprocating piston 101, the outlet valve 106 is arranged in the closed position, which is exemplified in FIG. 4c. Hence, during the final motion of the reciprocating piston 101 towards the BDC 402, fluid medium is provided into the combustion chamber 403 only via the inlet valve 104. When the reciprocating piston thereafter arrives at the BDC 402, the reciprocating piston initiates its upward motion towards the BDC 404, whereby the inlet valve 104 and the outlet valve 106 are arranged in the closed position. Hence, the compression stage is initiated.

Figure 5:
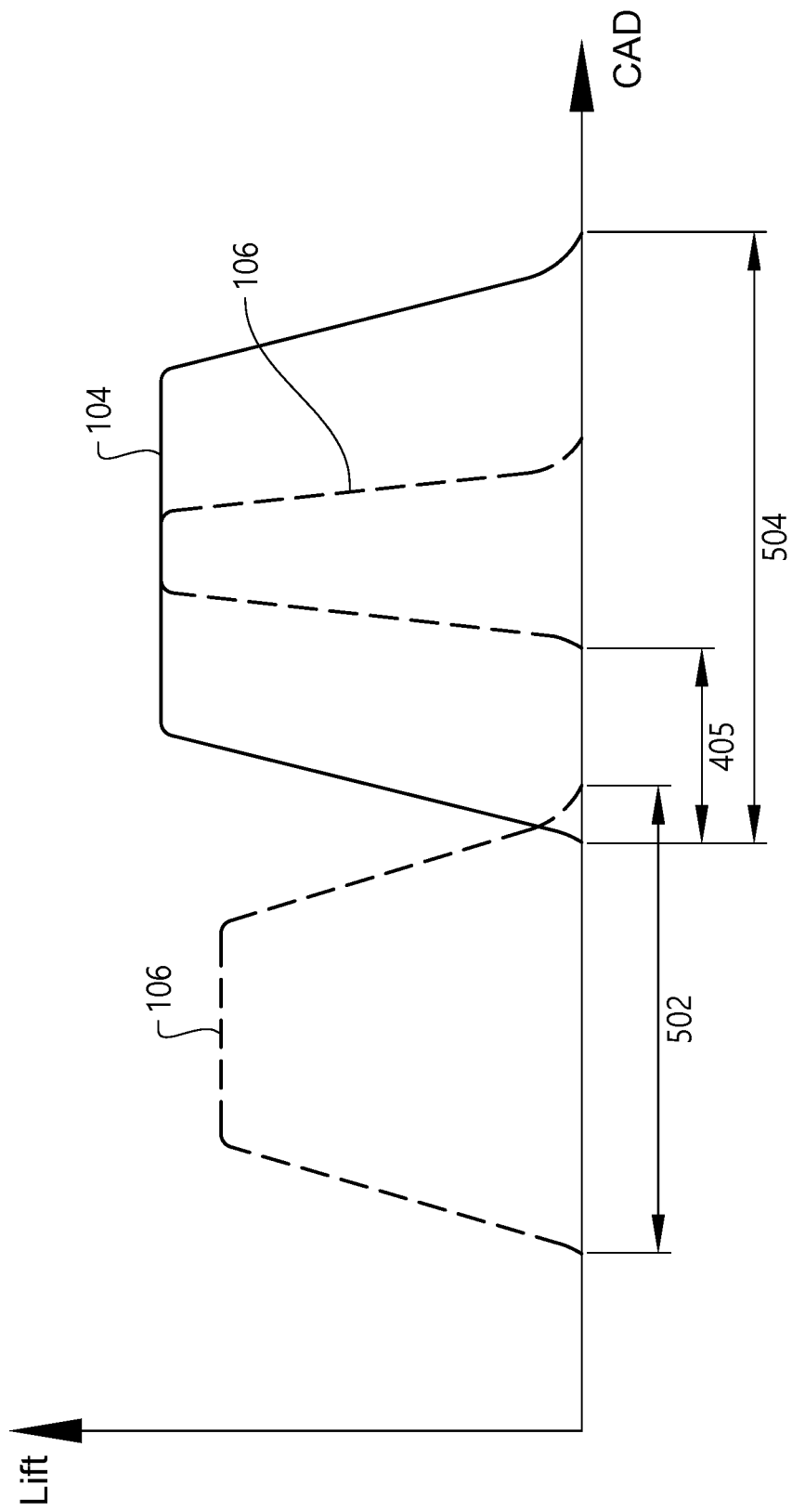
FIG. 5 is a graph illustrating the openness degree of the inlet and outlet valves during operation according to an example embodiment.

Turning to FIG. 5, which is a graph illustrating the opening of the inlet 104 and outlet 106 valves during operation according to an example embodiment. FIG. 5 merely illustrates the valve positions described in relation to FIGS. 4a-4c in further detail using the actuator depicted in FIG. 3. As can be seen in FIG. 5, the exhaust stroke is indicated by reference numeral 502 and the intake stroke is indicated by reference numeral 504.

As can be seen in FIG. 5, during the exhaust stroke 502, the outlet valve 106 is arranged in the open position for exhausting combustion gas out from the combustion chamber 403 and into the exhaust manifold (112 in FIG. 2). Thereafter, the intake stroke is initiated, whereby the inlet valve 104 is arranged in the open position. After approximately 60-70 CAD from the TDC, the outlet valve 106 is arranged in the at least partially open position for a short period of time to direct combustion gas into the combustion chamber. The outlet valve 106 is thereafter arranged in the closed position, where after the intake stroke is ended. The outlet valve 106 is depicted to be fully opened although it can be opened to a lesser extent. Also, the opening of the outlet valve must not be made centrally as depicted in FIG. 5. The opening of the outlet valve during the intake stroke can be executed approximately at any crank angle of the intake stroke, as long as there is no conflict between the outlet valve and the piston.

Figure 6:
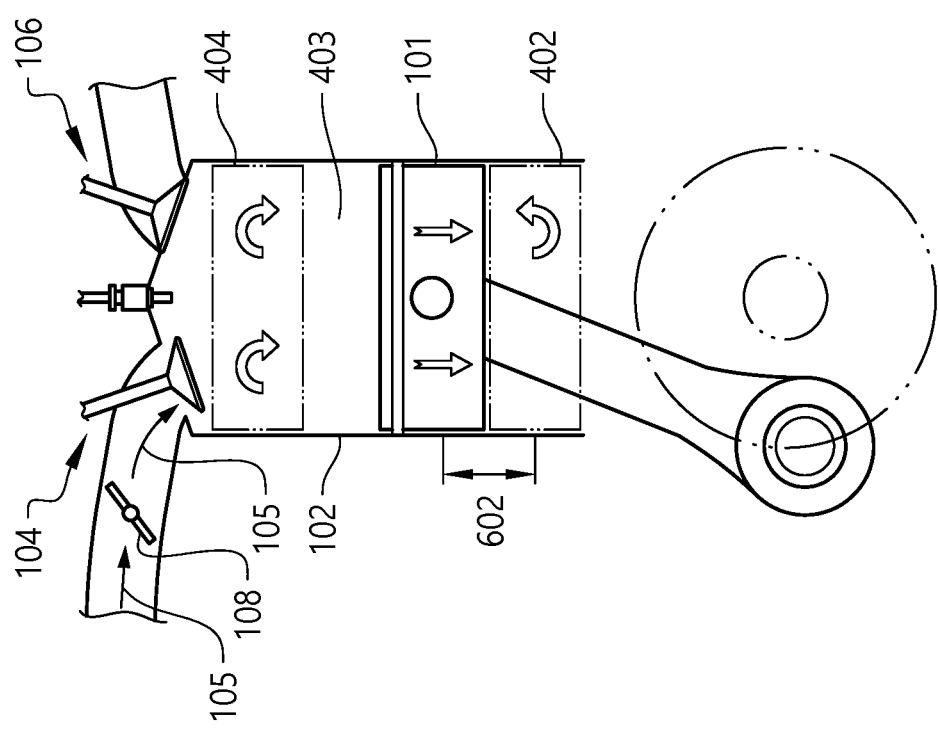
FIG. 6 illustrates a valve and throttle position during the intake stroke according to an example embodiment.

Reference is now made to FIG. 6 which illustrates the inlet valve and intake throttle 108 position during the intake stroke according to an example embodiment. The embodiment depicted in FIG. 6 may be used in combination with the embodiment depicted in FIGS. 4a-4c and 5.

During a portion of the intake stroke, the volume of fluid medium provided into the combustion chamber 403 is reduced. In the example embodiment depicted in FIG. 6, the reduction of volume of fluid medium is achieved by arranging the inlet valve 104 being arranged to be positioned in the closed position during the final CAD travel 602 of the reciprocating piston to the BDC 402. Flow of fluid medium 105 is thus prevented from reaching the combustion chamber 403. Hereby, the internal combustion engine 102 is controlled according the so-called Early Miller approach. Thus, less fluid medium is provided into the combustion chamber 403 which is advantageous during e.g. low engine load operation.

The reduction of volume of fluid medium may also be achieved by controlling the intake throttle 108 positioned upstream the inlet valve 104. The intake throttle 108 can thus reduce the volume of fluid flow directed into the combustion chamber. Also, the inlet valve 104 must not necessarily be fully closed. Instead, the inlet valve 104 can be arranged in a partially open position such that less fluid medium is provided into the combustion chamber 403. The reduction of volume of fluid medium may also be controlled by controlling both the intake throttle 108 as well as the inlet valve 104.

Figure 7:
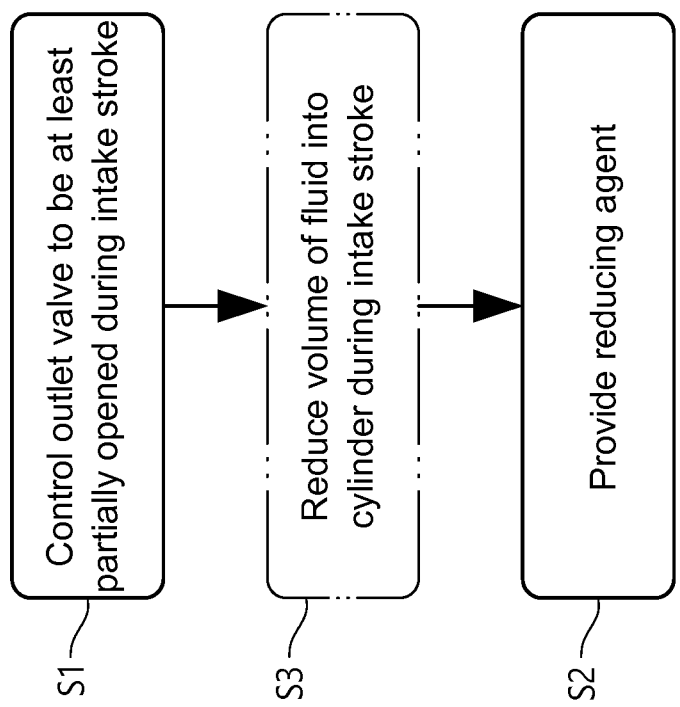
FIG. 7 is a flow chart of a method for controlling the internal combustion engine arrangement according to an example embodiment.

In order to sum up, reference is made to FIG. 7 which is a flow chart of a method for controlling the internal combustion engine arrangement according to an example embodiment. The internal combustion engine arrangement 100 is preferably operated according to the four stroke principle. First, during the intake stroke 504, the inlet valve 104 is arranged in the open position. Also, the control unit 400 controls S1 the outlet valve 106 to be arranged in the at least partially open position for allowing combustion gas to be directed into the combustion chamber 403. Thereafter, the combustion cylinder 102 is operated according to the compression stroke and the combustion stroke. After the combustion stroke, the reciprocating piston 101 moves from the BDC 402 in a direction towards the TDC 404, whereby the outlet valve 106 is arranged in the open position. Hence, the combustion cylinder 102 is operated in the exhaust stroke 502 for exhausting the combustion gas generated during the combustion stroke. During the exhaust stroke 502, the control unit 400 controls the reducing agent injector 110 to provide S2 reducing agent to at least a portion of the flow of combustion gas exhausted from the combustion cylinder during the exhaust stroke.

Hereby, the ammonia is formed which will make the SCR burn off at a lower temperature.

The at least portion of the flow which is provided with the reducing agent is preferably the part of the exhaust which will not be directly directed to the turbine inlet and is not rebreathed into the cylinder, thus not flushed away by any other cylinder. To achieve this, the exhaust conduit 115 may be larger than the similar conduits in order to store a larger amount of exhaust. The injection is preferably done during the exhaust stroke of the cylinder 102 but can be done at the end of the exhaust valve opening during intake stroke. By injecting during exhaust stroke instead of at the end of the intake stroke, the reductant droplets will have approximately 660 crank angle degrees of time, instead of e.g. 580 crank angle degrees of time, to evaporate, whereby the droplets will evaporate before flushing to the turbine by next exhaust stroke. At 1800 rpm, such crank angle degrees of time correspond to 55 ms and 48 ms, respectively and may require droplet diameter which is preferably smaller than 28 μm and 22 μm respectively for urea in order to fully evaporate at e.g. 300 degrees Celsius.

According to an alternative, the control unit 400 may also control (S3) the internal combustion engine to provide a reduced volume of fluid medium into the combustion cylinder during the intake stroke. This may be achieved by controlling the inlet valve 104 and/or the intake throttle 108 as described above in relation to the description of FIG. 5.

It is to be understood that the present invention is not limited to the embodiments described above and illustrated in the drawings; rather, the skilled person will recognize that many changes and modifications may be made within the scope of the appended claims.

The invention claimed is:

1. A method for controlling an internal combustion engine arrangement, the internal combustion engine arrangement comprising:
 a combustion cylinder housing a reciprocating piston movable between a bottom dead center and a top dead center within the combustion cylinder;
 an inlet valve operable between an open position and a closed position, the inlet valve being arranged in the open position during at least a part of an intake stroke of the reciprocating piston for allowing a flow of fluid medium into the combustion cylinder; and
 an outlet valve operable between an open position and a closed position, the outlet valve being arranged in the open position during at least a part of an exhaust stroke of the reciprocating piston for directing a flow of combustion gas out from the combustion cylinder and into an exhaust manifold of the internal combustion engine arrangement; the method comprising the steps of:
 controlling the outlet valve to be arranged in an at least partial open position during a portion of the intake stroke; and
 providing, during the exhaust stroke, a reducing agent to at least a portion of the flow of combustion gas exhausted into the exhaust manifold from the combustion cylinder, wherein the reducing agent is not rebreathed into the combustion cylinder.

2. The method according to claim 1, wherein the reducing agent is injected to the flow of combustion gas in the vicinity of the outlet valve.

3. The method according to claim 1, wherein the outlet valve is arranged in the at least partial open position when the piston is positioned between 60- 120crank angle degrees from the top dead center during the intake stroke.

4. The method according to claim 1, wherein the outlet valve is opened between 5- 45% of its full openness capacity during the portion of the intake stroke.

5. The method according to claim 1, further comprising the step of:
 controlling the internal combustion engine arrangement to provide a reduced volume of fluid medium into the combustion cylinder during the intake stroke.

6. The method according to claim 5, wherein the reduced volume of fluid medium is achieved by controlling the inlet valve to be arranged in the closed position during a portion of the intake stroke.

7. The method according to claim 5, wherein the reduced volume of fluid medium is achieved by controlling the inlet valve to be arranged in the closed position a distance before the piston reaches the bottom dead center during the intake stroke.

8. The method according to claim 5, wherein the reduced volume of fluid medium is achieved by controlling an intake throttle positioned in upstream fluid communication with the inlet valve.

9. The method according to claim 1, wherein the internal combustion engine arrangement comprises a plurality of combustion cylinders, each of the plurality of combustion cylinders housing a respective reciprocating piston, wherein the steps of controlling the outlet valve to be arranged in the at least partial open position during a portion of the intake stroke; and providing reducing agent to at least a portion of the flow of combustion gas exhausted from the combustion cylinder during the exhaust stroke is performed for a single one of the plurality of combustion cylinders.

10. The method according to claim 1, further comprising the steps of:
 determining an engine load for the internal combustion engine arrangement; and
 controlling the outlet valve to be arranged in an at least partial open position during a portion of the intake stroke; and providing reducing agent to at least a portion of the flow of combustion gas exhausted from the combustion cylinder during the exhaust stroke only if the engine load is below a predetermined threshold limit.

11. An internal combustion engine arrangement comprising:
 a combustion cylinder housing a reciprocating piston movable between a bottom dead center and a top dead center within the combustion cylinder;
 an inlet valve operable between an open position and a closed position, the inlet valve being arranged in the open position during at least a part of an intake stroke of the reciprocating piston for allowing a flow of fluid medium into the combustion cylinder;
 an outlet valve operable between an open position and a closed position, the outlet valve being arranged in the open position during at least a part of an exhaust stroke of the reciprocating piston for directing a flow of combustion gas out from the combustion cylinder;
 a reducing agent injector positioned in downstream fluid communication with the combustion cylinder and arranged to inject a reducing agent to at least a portion of the flow of combustion gas exhausted from the combustion cylinder during the exhaust stroke; and a control unit connectable to the outlet valve and the reducing agent injector, the control unit being configured to:

control the outlet valve to be arranged in an at least partial open position during a portion of the intake stroke; and control the reducing agent injector, during the exhaust stroke, to provide the reducing agent to at least a portion of the flow of combustion gas exhausted into the exhaust manifold from the combustion cylinder, wherein the reducing agent is not rebreathed into the combustion cylinder.

12. The internal combustion engine according to claim 11, further comprising an exhaust gas manifold arranged downstream the combustion cylinder for receiving the flow of combustion gas exhausted during the exhaust stroke, wherein the reducing agent injector is positioned in fluid communication between the combustion cylinder and the exhaust gas manifold.

13. The internal combustion engine arrangement according to claim 11, further comprising a controllable intake throttle arranged in upstream fluid communication with the inlet valve, wherein the controllable intake throttle is connected to the control unit, the control unit being further configured to:

control the controllable intake throttle to provide a reduced volume of fluid medium into the combustion cylinder during the intake stroke.

14. The internal combustion engine arrangement according to claim 11, wherein the inlet valve comprises a flow controllable inlet actuator connected to the control unit, the flow controllable inlet actuator being arranged to controllably operate the inlet valve between the open position and the closed position.

15. The internal combustion engine arrangement according to claim 11, wherein the outlet valve comprises a flow controllable outlet actuator connected to the control unit, the flow controllable outlet actuator being arranged to controllably operate the outlet valve between the open position and the closed position.

16. The internal combustion engine arrangement according to claim 11, further comprising a cam shaft for controlling the outlet valve between the open position and the closed position, wherein the cam shaft comprises a deactivatable protruding portion configured to arrange the outlet valve in the at least partial position during the portion of the intake stroke.

17. The internal combustion engine arrangement according to claim 11, wherein the control unit is further configured to control the internal combustion engine arrangement to perform any one of the method steps in claim 1.

18. A vehicle comprising an internal combustion engine arrangement according to claim 11.

19. A computer program comprising program code means for performing the steps of claim 1 when said program is run on a computer.

20. A computer readable medium carrying a computer program comprising program means for performing the steps of claim 1 when said program means is run on a computer.

* * * * *